(12) United States Patent
Nakamura et al.

(10) Patent No.: US 6,589,446 B1
(45) Date of Patent: Jul. 8, 2003

(54) CERAMIC SLURRY COMPOSITION

(75) Inventors: Ichiro Nakamura, Kusatsu (JP); Hidehiko Tanaka, Shiga-ken (JP)

(73) Assignee: Murata Manufacturing Co. Ltd (JP)

( * ) Notice: Subject to any disclaimer, the term of this patent is extended or adjusted under 35 U.S.C. 154(b) by 215 days.

(21) Appl. No.: 09/685,908

(22) Filed: Oct. 10, 2000

(30) Foreign Application Priority Data

Oct. 20, 1999 (JP) .............................. 11-297596

(51) Int. Cl.[7] .................................. C09K 3/00
(52) U.S. Cl. .................... 252/363.5; 106/499; 106/503; 106/505
(58) Field of Search ............. 252/363.5; 501/134; 106/499, 503, 505

(56) References Cited

U.S. PATENT DOCUMENTS 5,900,277 A * 5/1999 Fox et al.
5,997,794 A * 12/1999 Huang et al.

* cited by examiner

*Primary Examiner*—Christopher A. Fiorilla
(74) *Attorney, Agent, or Firm*—Dickstein, Shapiro, Morin & Oshinsky, LLP.

(57) ABSTRACT

A ceramic slurry composition has a powdered ceramic uniformly dispersed therein without excessive damage thereto. A method for producing a ceramic green sheet using the ceramic slurry composition and a method for producing multilayer ceramic electronic devices are also disclosed. The ceramic slurry composition contains the powdered ceramic, a dispersing agent, a binder and a solvent, in which an anionic dispersing agent is used as the dispersing agent, and the content of the anionic dispersing agent is set to be such that the total acid content thereof corresponds to about 10 to 150% of the total base content of the powdered ceramic. In addition, the powdered ceramic having an average particle diameter of about 0.01 to 1 $\mu$m is used.

15 Claims, 2 Drawing Sheets

CERAMIC SLURRY COMPOSITION

BACKGROUND OF THE INVENTION

1. Field of the Invention

The present invention relates to ceramic slurry compositions and methods for producing ceramic green sheets and multilayer ceramic electronic devices, and more particularly, relates to a ceramic slurry composition for use in production of ceramic electronic devices, such as multilayer ceramic capacitors and multilayer ceramic substrates, and to methods for producing a ceramic green sheet using the ceramic slurry composition and for producing a multilayer ceramic electronic device using the ceramic green sheets.

2. Description of the Related Art

Multilayer ceramic electronic devices, such as multilayer ceramic capacitors, and multilayer ceramic substrates, are generally produced by the steps of laminating ceramic green sheets, compressing the laminate and heating for sintering the ceramics and electrodes.

For example, when a multilayer ceramic capacitor as shown in FIG. 1 is produced in which internal electrodes 2 are formed in a ceramic element 1, and a pair of external electrodes 3a and 3b are formed at two side surfaces of the ceramic element 1 so as to be connected with the internal electrodes which alternately extend to one side surface and to the other side surface of the ceramic element 1, the method described below is generally used.

(1) Electrode-provided sheets 11 (see FIG. 2) are formed by disposing internal electrodes to be used as electrodes for a capacitor on the green sheets produced by the method mentioned above.

(2) A predetermined number of the electrode-provided sheets 11 are laminated as shown in FIG. 2, ceramic green sheets having no internal electrodes thereon (sheets used as outer layers) are disposed on the top and the bottom of the laminated sheets, and they are compressed, whereby a laminate (a compressed laminate) is formed in which ends of the internal electrodes 2 alternately extend to one side surface and to the other side surface of the laminate.

(3) The laminate is baked under predetermined conditions so as to be sintered, and an electroconductive paste is coated on two side surfaces of the baked laminate (the ceramic element 1) (see FIG. 1) and is baked, whereby the external electrodes 3a and 3b which are connected with the internal electrodes 2 are formed.

Accordingly, a multilayer ceramic capacitor as shown in FIG. 1 is produced.

Other multilayer ceramic electronic devices, such as multilayer ceramic substrates, are also produced by the step of laminating ceramic green sheets.

Ceramic green sheets for use in the production of multilayer ceramic electronic devices are generally formed by steps of preparing starting materials, such as a powdered ceramic, a dispersing medium (e.g., a solvent), a dispersing agent, a binder, and a plasticizer, so as to produce a predetermined composition; mixing and pulverizing the starting materials thus prepared by using a media-type mill, such as a bead mill, a ball mill, an attritor, a paint shaker and a sand mill, so as to form a ceramic slurry; molding the ceramic slurry into sheets having a predetermined thickness by methods such as the doctor blade method; and subsequently, drying the sheets thus formed. In this connection, the media-type mill mentioned above is an apparatus for dispersing a powdered ceramic between media by mixing and stirring the powdered ceramic with the media.

However, recently, miniaturization and improved performance have been required for various multilayer ceramic electronic devices, such as multilayer ceramic capacitors, as is the case with other electronic devices.

Accordingly, ceramic green sheets for use in the production of multilayer ceramic electronic devices must be thinner, and recently, use of extremely thin ceramic green sheets of 10 $\mu$m or less thick is increasingly necessary.

When the extremely thin ceramic green sheets described above are produced, a ceramic slurry used for production of ceramic green sheets must be used in which the starting powdered ceramic is sufficiently dispersed. Hence, as a starting powdered ceramic, a fine powdered ceramic having an average particle diameter of 0.01 to 1 $\mu$m must be used.

However, in a ceramic slurry used for the production of the ceramic green sheet as described above, in general, a dispersing agent is conventionally used which is a lower molecular compound of a binder in consideration of the compatibility with the binder.

That is, as a binder, polyvinyl butyral resins, cellulose resins, acrylic resins, vinyl acetate resins, polyvinyl alcohol resins and the like are often used, and hence, lower molecular compounds of the binder mentioned above are generally used as a dispersing agent.

In this connection, most of the resins used as binders, such as polyvinyl butyral resins, cellulose resins, acrylic resins, vinyl acetate resins and polyvinyl alcohol resins, are nonionic compounds, and as a result, the low molecular resins thereof used as dispersing agents are also nonionic compounds.

The nonionic dispersing agents mentioned above have low adsorbing rates on powdered ceramics, and hence, a fine powdered ceramic having particles of 1 $\mu$m or less in diameter, which has strong cohesive force, cannot be rapidly and efficiently dispersed. Consequently, there are problems in that serious damage is done to the powdered ceramic and the productivity is decreased due to the longer time required in the dispersing step.

SUMMARY OF THE INVENTION

Accordingly, taking into consideration the problems described above, an object of the present invention is to provide a ceramic slurry composition having superior productivity in which a powdered ceramic can be efficiently dispersed without causing serious damage thereto, and to provide methods for producing ceramic green sheets using the ceramic slurry composition and for producing a ceramic electronic devices using the ceramic green sheets.

To these ends, a ceramic slurry composition of the present invention comprises a powdered ceramic, a dispersing agent, a binder and a solvent, wherein the dispersing agent is an anionic dispersing agent, and the content of the anionic dispersing agent is so that the total acid amount thereof corresponds to about 10 to 150% of the total base amount of the powdered ceramic.

As an anionic dispersing agent which is preferably used for the present invention, an anionic dispersing agent having intermolecular carboxyl groups, maleate groups, sulfonic groups, phosphate groups or the like is mentioned as an example. In addition, polycarboxylic compounds and polymaleate compounds containing no metal ions are mentioned as more preferable anionic dispersing agents.

The anionic dispersing agent is preferably added so that the total acid amount thereof corresponds to about 10 to 150% of the total base amount of the powdered ceramic. The reason for this is that when the dispersing agent is added so that the total acid amount thereof is less than about 10% of the total base amount of the powdered ceramic, satisfactory dispersing effects cannot be obtained, and on the other hand, when the total acid amount is more than about 150%, significant further improvement in the dispersing effects cannot be observed.

In this connection, the total acid amount of the anionic dispersing agent and the total base amount of the powdered ceramic can be determined by a titration method or the like.

In the present invention, a binder containing a plasticizer, and/or an anti-statistic agent may be used. In addition, a binder containing other additives may also be used.

In the present invention, the dispersing method for dispersing a powdered ceramic is not specifically limited. Various dispersing methods may be used, for example, a method of using a media-type mill, such as a bead mill, a ball mill, an attritor, a paint shaker and a sand mill; a method of kneading a powdered ceramic, a dispersing medium, a dispersing agent, a binder, a plasticizer and the like; and a method of using a three-roll mill. In this connection, the method of using a three-roll mill is a method for dispersing a powdered ceramic in a mixture thereof with a dispersing medium, a dispersing agent, a binder, a plasticizer, and the like. In the method described above, the mixture is passed through a small gap between a first roller and a second roller, which roll independently from each other and are adjacent to each other with the small gap therebetween, so as to be compressed and kneaded, and subsequently, the mixture is passed between the second roller and a third roller, which rolls and is adjacent to the second roller with a smaller gap therebetween than the gap between the first and the second rollers, so as to be further compressed and kneaded.

In addition, when the ceramic slurry composition of the present invention is formed, the sequence of addition of dispersing agent and binder is not specifically limited. However, it is generally preferable that powdered ceramic, dispersing agent, and solvent be mixed and dispersed so that the dispersing agent is adsorbed on the powdered ceramic beforehand; a binder is then added to the mixture thus formed, and subsequently, mixing and dispersing is performed again.

In the ceramic slurry composition according to the present invention, the average particle diameter of the powdered ceramic is preferably about 0.01 to 1 μm.

According to the present invention, a ceramic slurry composition provided with superior dispersibility of a powdered ceramic having diameters of about 0.01 to 1 μm (the average particle diameter measured by an electron microscope), which is generally difficult to disperse by a conventional dispersing method, can be obtained. Hence, the present invention is particularly significant.

In addition, the present invention can be used when the particle diameter of a powdered ceramic is out of the range of about 0.01 to 1 μm.

A method for producing a ceramic green sheet of the present invention comprises the step of molding the ceramic slurry composition described above into a sheet on a predetermined substrate so as to form the green sheet.

Since the powdered ceramic is sufficiently dispersed in the ceramic slurry composition according to the present invention described above, the thin ceramic green sheets having high quality can be reliably produced by molding the ceramic slurry composition into sheets. That is, a ceramic green sheet preferably used for production of multilayer ceramic electronic devices can be produced, in which the ceramic green sheet has superior smooth surfaces, a high density and a high tensile strength, and in which resins, such as a binder and a plasticizer, are uniformly distributed therein. Furthermore, when a multilayer ceramic electronic device is produced by using the ceramic green sheets described above, a highly reliable multilayer ceramic electronic device having desired characteristics and high quality can be obtained.

In the method for producing the ceramic green sheet according to the present invention, the thickness of the ceramic green sheet is preferably about 0.1 to 10 μm.

According to the present invention, even when the ceramic green sheet is formed to be thin from about 0.1 to 10 μm, a ceramic green sheet having high quality can be reliably produced, and hence, ceramic green sheets preferably used for production of multilayer ceramic electronic devices can be obtained.

A method for producing a multilayer ceramic electronic device, according to the present invention, comprises a step of laminating the ceramic green sheets produced by the method for producing the ceramic green sheets described above together with internal electrodes composed of a base metal, a step of cutting the laminated ceramic green sheets, a step of baking the laminated ceramic green sheets and a step of forming external electrodes.

A highly reliable multilayer ceramic electronic device having desired characteristics and high quality can be formed by the steps of producing ceramic green sheets using the ceramic slurry formed by the method according to the present invention described above, laminating the ceramic green sheets together with the internal electrodes composed of a base metal, cutting, baking, and forming the external electrodes.

A method for producing multilayer ceramic electronic devices of the present invention, comprises steps of laminating the ceramic green sheets, which are produced by the method for producing the green sheets described above, together with the internal electrodes composed of a base metal; cutting; baking; and forming the external electrodes. Since the ceramic green sheets having a higher density and superior smooth surfaces are used, the rate of occurrence of short-circuiting can be decreased, and hence, the reliability thereof can be improved. In addition, since serious damage is not done to a powdered ceramic, the reproducibility of the target characteristics can be improved.

DESCRIPTION OF THE PREFERRED EMBODIMENTS

Figure 1:
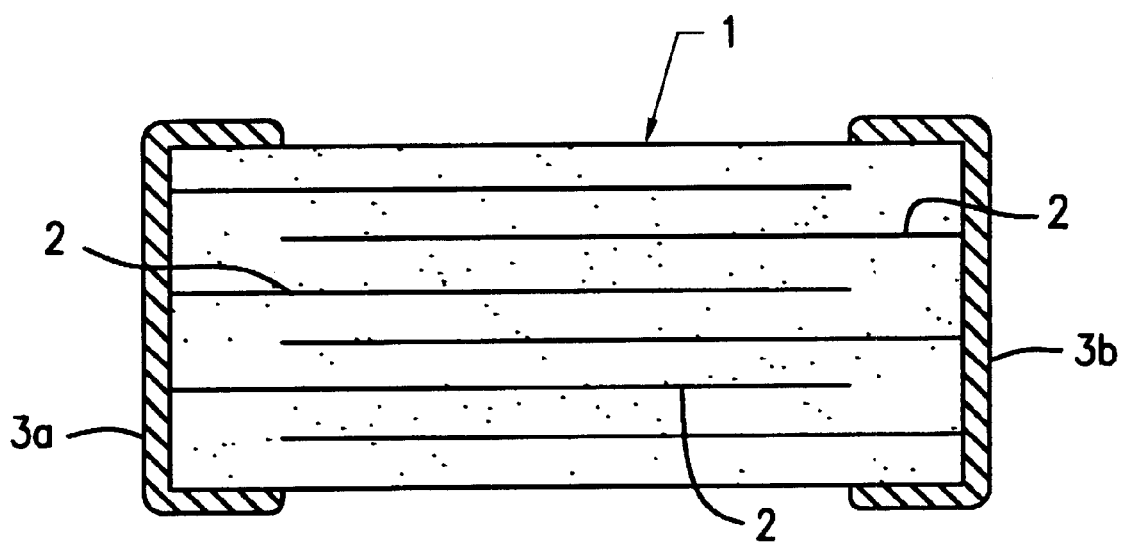
FIG. 1 is a cross-sectional view of a multilayer ceramic capacitor produced by laminating ceramic green sheets.

Hereinafter, the present invention will be described in detail with reference to the embodiments.

According to the present invention, the type of powdered ceramic and the composition thereof are not specifically limited, and the present invention can be broadly applied to ceramic slurries using various powdered ceramics composed of dielectric powdered ceramics, such as barium titanates, strontium titanate and lead titanate; magnetic powdered ceramics, such as ferrite; piezoelectric powdered ceramics; and insulating powdered ceramics, such as alumina and silica.

The particle diameter of the powdered ceramic is not specifically limited; however, when a powdered ceramic having an average particle diameter of about 0.01 to 1 μm, measured by using an electron microscope, is used, which is difficult to disperse by a conventional dispersing method as described above, the advantages of the present invention can be fully utilized.

The powdered ceramic may contain additives and the like. For example, when a powdered ceramic is primarily composed of barium titanate, the powdered ceramic may contain glass, magnesium oxide, manganese oxide, barium oxide, rare-earth oxides, calcium oxide and the like.

In the present invention, the type of solvent (dispersing medium) is not specifically limited. Various solvents may be used, for example, aromatic compounds, such as toluene and xylene, and alcohol compounds, such as ethyl alcohol, isopropyl alcohol and butyl alcohol. In addition, the solvents mentioned above may be used alone or combination thereof.

As a dispersing medium, solvents other than these mentioned above may be used, and water may also be used.

As a binder, polyvinyl butyral resins, cellulose resins, acrylic resins, vinyl acetate resins, polyvinyl alcohol resins and the like may be used. According to the ceramic green sheet to be formed, the type and the amount of the binder is optionally determined.

The ceramic slurry composition of the present invention may also contain a plasticizer, and various plasticizers, such as polyethylene glycol or phthalic esters, may be appropriately used. The amount thereof is optionally determined in accordance with the ceramic green sheet to be formed.

The specifications thus described for powdered ceramics, dispersing media, plasticizers, and the like can be applied to every aspect of the present invention.

Hereinafter, examples of the present invention will be described in detail.

EXAMPLE 1

(1) A powdered ceramic, a dispersing agent, a binder, a plasticizer and a solvent were mixed together so as to produce the composition described below.
- (a) A commercially available dielectric material (a powdered ceramic containing additives) having an average particle diameter of 0.2 μm and an average base amount of 40 μmol/g: 100 parts by weight
- (b) An anionic dispersing agent having an average acid amount of 960 μmol/g: 2 parts by weight (the total acid amount of the anionic dispersing agent corresponded to 48% of the total base amount of the powdered ceramic)
- (c) A binder (an acrylic binder): 10 parts by weight
- (d) A plasticizer (dioctyl phthalate (hereinafter referred to as "DOP"): 1.4 parts by weight
- (e) A solvent: 70 parts by weight of toluene and 70 parts by weight of ethyl alcohol (2) Next, the starting materials thus prepared were mixed and pulverized for 5 hours by a ball mill using 500 parts by weight of balls 2 mm in diameter composed of zirconia, thereby yielding a finished dispersed slurry (a ceramic slurry composition) for forming ceramic green sheets.

The dispersibility of the ceramic slurry composition thus formed was measured using a measurement apparatus of particle size distribution made by Microtrack.

The 90% average particle diameter (D90) of the particle size distribution was 0.60 μm.

The ceramic slurry composition was dehydrated and was heated to 500° C. to remove the binder, and the specific surface area thereof was measured. The rate of increase in the specific surface area from the original specific surface area was 8%.

The ceramic slurry composition was formed into sheets by a doctor blade method, thereby yielding ceramic green sheets.

The surface roughness (Ra) of the ceramic green sheet thus formed was measured by an atomic force microscope, and as a ratio of density of the ceramic green sheet, the ratio of the measured density to the theoretical density (density ratio=the measured density/the theoretical density) was measured. The results were that the Ra was 81 nm and the density ratio was 0.81.

Next, a multilayer ceramic capacitor was produced by using the ceramic green sheets, in which, as shown in FIG. 1, internal electrodes 2 alternately extended to one side surface and the other side surface of a ceramic element 1 were formed therein, and a pair of external electrodes 3a and 3b were formed so as to be connected with the internal electrodes 2.

A method for producing the multilayer ceramic capacitor will be described below.

(1) Screen printing of a nickel (Ni) paste was performed on the ceramic green sheets thus formed, thereby yielding electrode-provided sheets having internal electrodes thereon to be used as capacitor electrodes.

Figure 2:
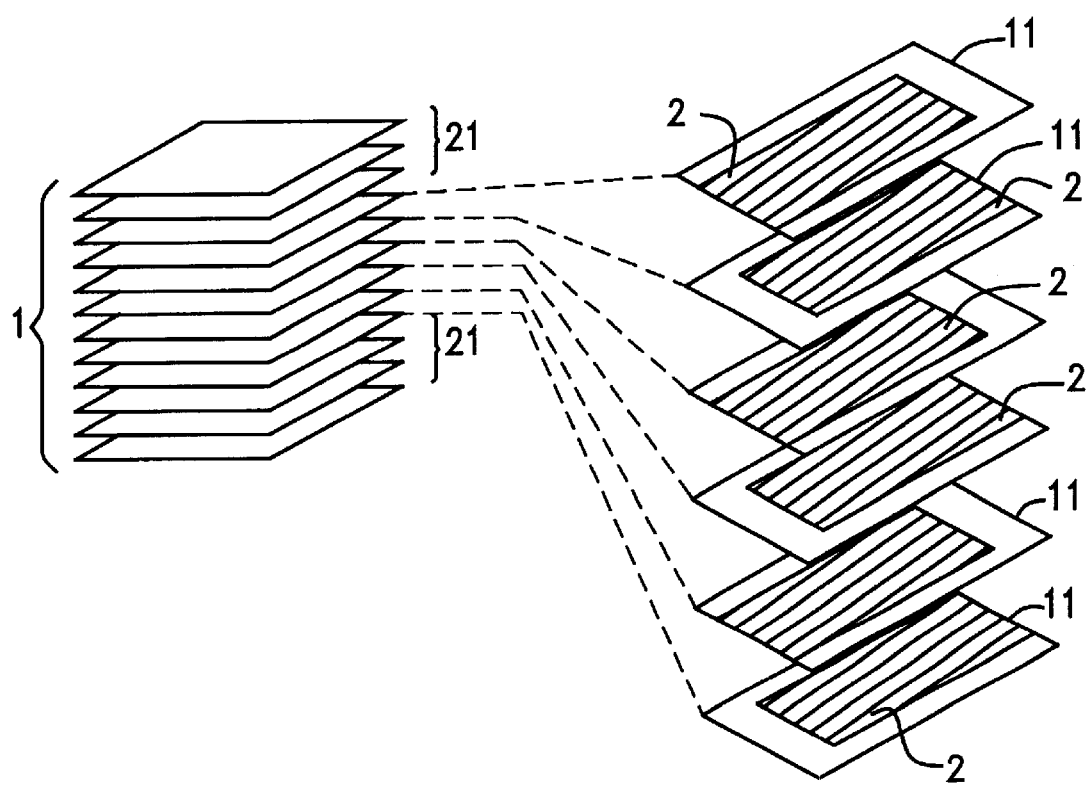
FIG. 2 is a schematic view showing a method for producing a multilayer ceramic capacitor.

(2) Next, as shown in FIG. 2, a predetermined number of the electrode-provided sheets 11 were laminated, ceramic green sheets having no electrodes thereon (sheets for the outer layers) were laminated on the top and the bottom of the laminate of the electrode-provided sheets 11, and they were compressed, thereby yielding a laminate (a compressed laminate) in which the ends of the individual internal electrodes 2 alternately extended to one side surface and to the other side surface of the laminate.

(3) The compressed laminate thus formed was cut into a predetermined size by using a dicer, the binder therein was removed, and the laminate thus obtained was then baked.

The binder was removed by heating in a nitrogen atmosphere.

The baking was performed by heating to a predetermined temperature in a weakly reducing atmosphere.

(4) Next, an electroconductive past having silver as an electroconductive component was coated on two side surfaces of the baked laminate (the ceramic element 1) and was baked, thereby forming the external electrodes 3a and 3b (see FIG. 1) which were connected with the internal electrodes 2.

As described above, a multilayer ceramic capacitor having the internal electrodes 2 composed of Ni as shown in FIG. 1 was obtained.

The rate of occurrence of short-circuiting of the multilayer ceramic capacitor thus formed was measured, and the result was superior, such as 13%. In addition, the temperature coefficient of static capacitance met the X7R specification.

EXAMPLE 2

(1) A powdered ceramic, a dispersing agent, a binder, a plasticizer and a solvent were mixed together so as to produce the composition described below.
- (a) A commercially available dielectric material (a powdered ceramic containing additives) having an average particle diameter of 0.2 μm and an average base amount of 40 μmol/g: 100 parts by weight
- (b) An anionic dispersing agent having an average acid amount of 960 μmol/g: 2 parts by weight (the total acid amount of the anionic dispersing agent corresponded to 48% of the total base amount of the powdered ceramic)

(c) A solvent: 35 parts by weight of toluene and 35 parts by weight of ethyl alcohol (2) Next, the starting materials thus prepared were mixed and pulverized by a ball mill using 500 parts by weight of balls 2 μm in diameter composed of zirconia for 5 hours, thereby yielding a slurry.

(3) A binder solution composed of 10 parts by weight of an acrylic resin as a binder, 1.4 parts by weight of dioctyl phthalate as a plasticizer, and a solvent comprised of 35 parts by weight of toluene and 35 parts by weight of ethyl alcohol was prepared beforehand by stirring and dissolving. The binder solution was then added to the mixed and pulverized slurry described above.

(4) Subsequently, the slurry containing the binder solution was mixed and pulverized by a ball mill for 5 hours, thereby yielding a finished dispersed slurry for forming ceramic green sheets.

The dispersibility of the ceramic slurry composition thus formed was measured using a measurement apparatus of particle size distribution made by Microtrack. The D90 was 0.50 μm.

The ceramic slurry composition was dehydrated and was heated to 500° C. to remove the binder, and the specific surface area thereof was measured. The rate of increase in the specific surface area from the original specific surface area was 12%.

The ceramic slurry composition was formed into sheets by a doctor blade method, thereby yielding ceramic green sheets.

The surface roughness (Ra) of the ceramic green sheet thus formed was measured by an atomic force microscope, and as the ratio of density of the ceramic green sheet, the ratio of the measured density to the theoretical density (the measured density/the theoretical density) was measured. The results were that the Ra was 72 nm and the density ratio was 0.94.

Next, a multilayer ceramic capacitor was formed by using the ceramic green sheets.

Since the multilayer ceramic capacitor was formed in a manner equivalent to that described in Example 1, the description thereof is omitted to avoid duplication.

The rate of occurrence of short-circuiting of the multilayer ceramic capacitor thus formed was superior, such as 9%, and the temperature coefficient of the static capacitance met the X7R specification.

EXAMPLE 3

A ceramic slurry composition was formed in a manner equivalent to that described in Example 2, except that the binder was instead a polyvinyl butyral resin.

The dispersibility of the ceramic slurry composition formed in Example 3 was measured using a measurement apparatus of particle size distribution made by Microtrack. The D90 was 0.50 μm.

The ceramic slurry composition was dehydrated and was heated to 500° C. to remove the binder, and the specific surface area thereof was measured. The rate of increase in the specific surface area from the original specific surface area was 12%.

The ceramic slurry composition of Example 3 was formed into sheets by a doctor blade method, thereby yielding ceramic green sheets.

The surface roughness (Ra) of the ceramic green sheet thus formed was measured by an atomic force microscope, and as the ratio of density of the ceramic green sheet, the ratio of the measured density to the theoretical density (the measured density/the theoretical density) was measured. The results were that the Ra was 71 nm and the ratio of density was 0.93.

Next, a multilayer ceramic capacitor was formed by using the ceramic green sheets.

The multilayer ceramic capacitor was formed in a manner equivalent to that described in Example 1.

The rate of occurrence of short-circuiting of the multilayer ceramic capacitor thus formed was superior, such as 8%, and the temperature coefficient of the static capacitance met the X7R specification.

EXAMPLE 4

A ceramic slurry composition was formed in a manner equivalent to that described in Example 2 except that the amount of the anionic dispersing agent was changed from 2 parts by weight to 6 parts by weight (the total acid amount of the anionic dispersing agent corresponded to 144% of the total base amount of the powdered ceramic).

The dispersibility of the ceramic slurry composition thus formed was measured using a measurement apparatus of particle size distribution made by Microtrack. The D90 was 0.58 μm. In addition, the ceramic slurry composition was dehydrated and was heated to 500° C. to remove the binder, and the specific surface area thereof was measured. The rate of increase in the specific surface area from the original specific surface area was 8%.

The ceramic slurry composition was formed into sheets in a manner equivalent to that described in Example 1, thereby yielding ceramic green sheets. The Ra and the density ratio of the ceramic green sheet thus obtained were 74 nm and 0.91, respectively.

Next, a multilayer ceramic capacitor was formed by using the ceramic green sheets in a manner equivalent to that described in Example 1.

The rate of occurrence of short-circuiting of the multilayer ceramic capacitor thus formed was superior, such as 13%. In addition, the temperature coefficient of the static capacitance met the X7R specification.

EXAMPLE 5

A ceramic slurry composition was formed in a manner equivalent to that described in Example 1, except that the amount of the anionic dispersing agent was changed from 2 parts by weight to 0.4 part by weight (the total acid amount of the anionic dispersing agent corresponded to 9.6% of the total base amount of the powdered ceramic).

The dispersibility of the ceramic slurry thus formed was measured using a measurement apparatus of particle size distribution made by Microtrack. The D90 was 0.62 μm. The ceramic slurry composition was dehydrated and was heated to 500° C. to remove the binder, and the specific surface area thereof was then measured. The rate of increase in the specific surface area from the original specific surface area was 8%.

The ceramic slurry composition was formed into sheets in a manner equivalent to that described in Example 1, thereby yielding ceramic green sheets. The Ra and the density ratio of the ceramic green sheet thus obtained were 85 nm and 0.83, respectively.

Next, a multilayer ceramic capacitor was formed by using the ceramic green sheets in a manner equivalent to that described in Example 1.

The rate of occurrence of short-circuiting of the multilayer ceramic capacitor thus formed was superior, such as 15%. In addition, the temperature coefficient of the static capacitance met the X7R specification.

COMPARATIVE EXAMPLE 1

A ceramic slurry composition was formed in a manner equivalent to that described in Example 1, except that the dispersing agent was changed to a low molecular acrylic resin.

The dispersibility of the ceramic slurry composition formed in Comparative Example 1 was measured using a measurement apparatus of particle size distribution made by Microtrack. The D90 was 0.70 μm.

The ceramic slurry composition was dehydrated and was heated to 500° C. to remove the binder, and the specific surface area thereof was then measured. The rate of increase in the specific surface area from the original specific surface area was 8%.

The ceramic slurry composition of Comparative Example 1 was formed into sheets by a doctor blade method, thereby yielding ceramic green sheets.

The surface roughness Ra, and as the ratio of density of the ceramic green sheet thus obtained, the ratio of the measured density to the theoretical density (the measured density/the theoretical density) of the ceramic green sheet thus obtained were measured. The Ra was 112 nm, and the density ratio was 0.74.

Next, a multilayer ceramic capacitor was formed by using the ceramic green sheets in a manner equivalent to that described in Example 1.

The rate of occurrence of short-circuiting of the multilayer ceramic capacitor thus formed was high, such as 51%. In addition, the temperature coefficient of the static capacitance met the X7R specification.

COMPARATIVE EXAMPLE 2

A ceramic slurry composition was formed in a manner equivalent to that described in Example 1, except that the amount of the anionic dispersing agent was changed from 2 parts by weight to 0.2 part by weight (the total acid amount of the anionic dispersing agent corresponded to 5% of the total base amount of the powdered ceramic).

The dispersibility of the ceramic slurry thus formed was measured using a measurement apparatus of particle size distribution made by Microtrack. The D90 was 0.70 μm. The ceramic slurry composition was dehydrated and was heated to 500° C. to remove the binder, and the specific surface area thereof was then measured. The rate of increase in the specific surface area from the original specific surface area was 8%.

The ceramic slurry composition of Comparative Example 2 was formed into sheets by a doctor blade method, thereby yielding ceramic green sheets.

The surface roughness Ra of the ceramic green sheet thus obtained was measured by an atomic force microscope, and as the ratio of density of the ceramic green sheet, the ratio of the measured density to the theoretical density (the measured density/the theoretical density) thereof was measured. The Ra was 111 nm, and the density ratio was 0.74.

Next, a multilayer ceramic capacitor was formed by using the ceramic green sheets in a manner equivalent to that described in Example 1.

The rate of occurrence of short-circuiting of the multilayer ceramic capacitor thus formed was high, such as 49%, and the temperature coefficient of the static capacitance met the X7R specification.

COMPARATIVE EXAMPLE 3

A ceramic slurry composition was formed in a manner equivalent to that described in Example 1 except that the dispersing agent was changed to a low molecular acrylic resin and that the time for mixing and pulverizing by a ball mill was changed to 24 hours.

The dispersibility of the ceramic slurry composition thus formed according to the method in Comparative Example 3 was measured using a measurement apparatus of particle size distribution made by Microtrack. The D90 was 0.60 μm.

The ceramic slurry composition was dehydrated and was heated to 500° C. to remove the binder, and the specific surface area thereof was then measured. The rate of increase in the specific surface area from the original specific surface area was 30%.

The ceramic slurry composition of Comparative Example 3 was formed into sheets by a doctor blade method, thereby yielding ceramic green sheets.

The surface roughness Ra of the ceramic green sheet thus formed was measured by an atomic force microscope, and as the ratio of density of the ceramic green sheet, the ratio of the measured density to the theoretical density (the measured density/the theoretical density) was measured. The Ra was 75 nm, and the density ratio was 0.90.

Next, a multilayer ceramic capacitor was formed by using the ceramic green sheets in a manner equivalent to that described in Example 1.

The rate of occurrence of short-circuiting of the multilayer ceramic capacitor thus formed was 13%, and the temperature coefficient of the static capacitance did not meet the X7R specification.

The data of Examples 1 to 5 and the data of Comparative Examples 1 to 3 are shown in Table 1, in which the data are of the dispersibility and the rate of increase in the specific surface area after the removal of the binder of the ceramic slurry composition; the surface roughness and the density ratio of the ceramic green sheet; and the rate of occurrence of short-circuiting and the temperature coefficient of the static capacitance of the multilayer ceramic capacitor formed by using the ceramic green sheets.

The present invention is not limited to the embodiments and the examples described above, and the powdered ceramics, solvents, specific dispersing methods, and the conditions thereof may be varied or may be modified within the scope of the present invention.

As described above, since the ceramic slurry composition of the present invention uses an anionic dispersing agent, the dispersibility of the powdered ceramic is superior. In addition, as an anionic dispersing agent is used, the powdered ceramic can be efficiently dispersed in a short period, and hence, an economical ceramic slurry composition provided with desired dispersibility can be obtained.

Since the powdered ceramic can be dispersed in a short period, a ceramic slurry composition having desired characteristics can be provided, in which excessively large specific surface area will not occur, and in which the crystallinity of the powdered ceramic is not degraded.

TABLE 1

|  | Dispersibility (D90(μm)) | Rate of Increase in Specific Surface Area (%) | Surface Roughness of Sheet (Ra(nm)) | Ratio of Sheet Density | Rate of Occurrence of Short-Circuiting (%) | Temperature Coefficient of Static Capacitance |
|---|---|---|---|---|---|---|
| Example 1 | 0.60 | 8 | 81 | 0.81 | 13 | X7R |
| Example 2 | 0.50 | 12 | 72 | 0.94 | 9 | X7R |
| Example 3 | 0.50 | 12 | 71 | 0.93 | 8 | X7R |
| Example 4 | 0.58 | 8 | 74 | 0.91 | 13 | X7R |
| Example 5 | 0.62 | 8 | 85 | 0.83 | 15 | X7R |
| Comparative Example 1 | 0.70 | 8 | 112 | 0.74 | 51 | X7R |
| Comparative Example 2 | 0.70 | 8 | 111 | 0.74 | 49 | X7R |
| Comparative Example 3 | 0.60 | 30 | 76 | 0.89 | 13 | B |

What is claimed is:

1. A ceramic slurry composition for use in the production of ceramic electronic device comprising:
   a basic powdered ceramic;
   a dispersing agent;
   a binder; and
   a solvent;
   wherein the dispersing agent is an anionic dispersing agent having acid groups, and the content of the anionic dispersing agent is such that the total acid amount thereof corresponds to about 10 to 150% of the total base amount of the powdered ceramic.

2. A ceramic slurry composition according to claim 1, wherein the average particle diameter of the powdered ceramic is about 0.01 to 1 μm.

3. A ceramic slurry composition according to claim 2, wherein the anionic dispersing agent has at least one intermolecular carboxyl group, maleate group, sulfonic group, or phosphate group.

4. A ceramic slurry composition according to claim 3, wherein the anionic dispersing agent is a polycarboxylic compound or polymaleate compound containing no metal ions.

5. A ceramic slurry composition according to claim 1, wherein the anionic dispersing agent has at least one intermolecular carboxyl group, maleate group, sulfonic group, or phosphate group.

6. A ceramic slurry composition according to claim 5, wherein the anionic dispersing agent is a polycarboxylic compound or polymaleate compound containing no metal ions.

7. A ceramic slurry composition according to claim 1, wherein the anionic dispersing agent is a polycarboxylic compound or polymaleate compound containing no metal ions.

8. A ceramic slurry composition for use in the production of ceramic electronic device comprising:
   a basic powdered ceramic selected from the group consisting of dielectric ceramic, magnetic ceramic, piezoelectric ceramic and insulating ceramic;
   a dispersing agent;
   a binder; and
   a solvent;
   wherein the dispersing agent is an anionic dispersing agent having acid groups, and the content of the anionic dispersing agent is such that the total acid amount thereof corresponds to about 10 to 150% of the total base amount of the powdered ceramic.

9. A ceramic slurry composition according to claim 8, wherein the average particle diameter of the powdered ceramic is about 0.01 to 1 μm.

10. A ceramic slurry composition according to claim 9, wherein the anionic dispersing agent has at least one intermolecular carboxyl group, maleate group, sulfonic group, or phosphate group.

11. A ceramic slurry composition according to claim 10, wherein the anionic dispersing agent is a polycarboxylic compound or polymaleate compound containing no metal ions.

12. A ceramic slurry composition according to claim 8, wherein the anionic dispersing agent has at least one intermolecular carboxyl group, maleate group, sulfonic group, or phosphate group.

13. A ceramic slurry composition according to claim 12, wherein the anionic dispersing agent is a polycarboxylic compound or polymaleate compound containing no metal ions.

14. A ceramic slurry composition according to claim 8, wherein the anionic dispersing agent is a polycarboxylic compound or polymaleate compound containing no metal ions.

15. A ceramic slurry according to claim 8, wherein the powdered ceramic is a dielectric titanate.

* * * * *